US009586585B2

(12) United States Patent
Delp et al.

(10) Patent No.: US 9,586,585 B2
(45) Date of Patent: Mar. 7, 2017

(54) AUTONOMOUS VEHICLE DETECTION OF AND RESPONSE TO TRAFFIC OFFICER PRESENCE

(71) Applicant: Toyota Motor Engineering & Manufacturing North America, Inc., Erlanger, KY (US)

(72) Inventors: Michael J. Delp, Ann Arbor, MI (US); Derek S. Caveney, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 75 days.

(21) Appl. No.: 14/548,519

(22) Filed: Nov. 20, 2014

(65) Prior Publication Data
US 2016/0144867 A1     May 26, 2016

(51) Int. Cl.
*G01C 22/00*     (2006.01)
*B60W 30/18*     (2012.01)

(52) U.S. Cl.
CPC .... *B60W 30/18109* (2013.01); *B60W 30/181* (2013.01); *B60W 2550/22* (2013.01)

(58) Field of Classification Search
CPC ........ B62D 1/00; G05D 1/0044; G06F 3/017; G06K 9/00375; G06K 9/00536;
(Continued)

(56) References Cited

U.S. PATENT DOCUMENTS 5,551,177 A * 9/1996 Cowgill ................ B60Q 7/005
                                          116/63 P
6,442,473 B1 * 8/2002 Berstis ............. G08G 1/096716
                                                340/905
(Continued)

FOREIGN PATENT DOCUMENTS

| DE | 102008060768 A1 | 9/2009 |
| JP | 2006264465 A | 10/2006 |
| JP | 2010254115 A | 11/2010 |

OTHER PUBLICATIONS

Le, Pham, Le; "Road Traffic Control Gesture Recognition using Depth Images"; IEEK Transactions on Smart Processing and Computing, vol. 1, No. 1; Jul. 2012; in 7 pages.
(Continued)

*Primary Examiner* — Khoi Tran
*Assistant Examiner* — Jorge Peche
(74) *Attorney, Agent, or Firm* — Christopher G. Darrow; Darrow Mustafa PC

(57) ABSTRACT

An automated driving system and methods are disclosed. The automated driving system includes a perception system disposed on an autonomous vehicle. The automated driving system can detect, based on images captured using the perception system, a traffic officer wielding a traffic signal device such as the traffic officer's hand, or a wand, sign, or flag. The automated driving system can also determine whether the traffic officer is directing a traffic signal to the autonomous vehicle with the traffic signal device, and if so, determine whether content of the traffic signal is recognized. If the content of the traffic signal is recognized, the autonomous vehicle can respond in a manner consistent with the content of the traffic signal. If the content of the traffic signal is not recognized, the autonomous vehicle can respond by treating the traffic signal as a stop signal.

20 Claims, 6 Drawing Sheets

(58) Field of Classification Search
CPC .... G06K 9/00805; G08G 1/0104; G08G 1/07; G01C 21/3415; G01C 21/26; G01C 21/3632; B60W 10/04; B60W 2550/10; B60W 30/09
USPC .................................... 701/28, 36, 117, 436
See application file for complete search history.

(56) References Cited

U.S. PATENT DOCUMENTS

| | | | | |
|---|---|---|---|---|
| 6,801,638 | B1* | 10/2004 | Janssen | B60K 35/00 340/910 |
| 8,942,881 | B2* | 1/2015 | Hobbs | B60K 37/06 701/1 |
| 8,954,252 | B1* | 2/2015 | Urmson | G08G 1/166 180/167 |
| 8,996,228 | B1* | 3/2015 | Ferguson | G01C 21/3461 348/118 |
| 9,056,395 | B1* | 6/2015 | Ferguson | B60W 30/00 |
| 9,218,063 | B2* | 12/2015 | Galor | G06F 3/017 |
| 9,248,834 | B1* | 2/2016 | Ferguson | B60W 30/09 |
| 2006/0117297 | A1* | 6/2006 | Janssen | B60R 16/0237 717/120 |
| 2008/0187318 | A1* | 8/2008 | Osanai | H04B 10/116 398/129 |
| 2009/0058678 | A1* | 3/2009 | Matsuoka | B60Q 9/008 340/904 |
| 2009/0285445 | A1* | 11/2009 | Vasa | G01C 21/26 382/100 |
| 2010/0033571 | A1* | 2/2010 | Fujita | B60W 40/02 348/149 |
| 2010/0235034 | A1* | 9/2010 | Higgins | G05D 1/0083 701/28 |
| 2011/0182475 | A1* | 7/2011 | Fairfield | G06K 9/00825 382/104 |
| 2011/0199199 | A1* | 8/2011 | Perkins | B60Q 1/506 340/435 |
| 2011/0199231 | A1* | 8/2011 | Loiselle | G09F 9/33 340/907 |
| 2012/0059789 | A1* | 3/2012 | Sakai | G08G 1/161 706/52 |
| 2013/0077830 | A1* | 3/2013 | Liu | G06K 9/00818 382/104 |
| 2013/0154852 | A1* | 6/2013 | Kim | B60Q 5/006 340/904 |
| 2013/0218433 | A1* | 8/2013 | Matsuno | B60W 30/09 701/70 |
| 2013/0325241 | A1* | 12/2013 | Lombrozo | B60W 40/00 701/23 |
| 2014/0063232 | A1* | 3/2014 | Fairfield | G06K 9/78 348/118 |
| 2014/0067187 | A1* | 3/2014 | Ferguson | B60W 30/00 701/28 |
| 2014/0152488 | A1* | 6/2014 | Baba | G01S 13/931 342/70 |
| 2014/0222253 | A1 | 8/2014 | Siegel et al. | |
| 2015/0109148 | A1* | 4/2015 | Cheatham, III | G08G 1/005 340/944 |
| 2015/0158426 | A1* | 6/2015 | Sonoda | B60Q 5/006 340/436 |
| 2015/0210292 | A1* | 7/2015 | George-Svahn | B60W 50/10 701/45 |
| 2015/0220796 | A1* | 8/2015 | Yokoi | B60R 1/00 348/148 |
| 2015/0234459 | A1* | 8/2015 | George-Svahn | G06F 3/013 345/156 |
| 2015/0248131 | A1* | 9/2015 | Fairfield | G05D 1/0044 701/2 |
| 2015/0336502 | A1* | 11/2015 | Hillis | B60Q 1/26 701/23 |
| 2016/0003936 | A1* | 1/2016 | Hibino | G01S 13/42 342/27 |
| 2016/0061172 | A1* | 3/2016 | Sato | B60W 30/16 701/112 |

OTHER PUBLICATIONS

Urmson; Video Still Reference "Realizing Self-Driving Cars"; 2014 Robotics Science and Systems Invited Talk; Jul. 14, 2014; Retrieved from the Internet: <http://www.roboticsconference.org/talk-urmson.html> Traffic Officer: 36:09, 36:11.

* cited by examiner

AUTONOMOUS VEHICLE DETECTION OF AND RESPONSE TO TRAFFIC OFFICER PRESENCE

BACKGROUND

Fully or highly automated driving systems are designed to operate a vehicle on the road without driver interaction or other external control, for example, self-driving vehicles or autonomous vehicles. An autonomous vehicle can encounter situations where traffic is directed by a traffic officer, such as an unexpected downed traffic light or long line of vehicles heading into or out of a large event, such as a concert. The traffic officer will be directing traffic in a manner that does not necessarily follow the traffic rules or the fixed traffic signals traditionally associated with the location. An automated driving system is required that can detect the traffic officer and determine whether the traffic officer is directing traffic signals to the autonomous vehicle to determine how to proceed.

SUMMARY

Methods and systems for automated driving in the presence of traffic officers are described below. An autonomous vehicle can use its perception system to detect a traffic officer wielding a traffic signal device, such as a hand, a flag, a wand, or a sign. The autonomous vehicle can then determine whether the traffic officer is directing a traffic signal to the autonomous vehicle using the traffic signal device based, for example, on the pose or orientation of the traffic officer in reference to the autonomous vehicle. If the traffic signal is directed to the autonomous vehicle, the autonomous vehicle can analyze content of the traffic signal, for example, whether the traffic officer is sending a warning signal, a stop signal, or a proceed signal. If the content of the traffic signal is recognized, the autonomous vehicle can comply with the traffic signal. If the content of the traffic signal is not recognized, the autonomous vehicle can respond as is the traffic signal included a stop signal.

In one implementation, an automated driving system is disclosed. The automated driving system includes a perception system disposed on an autonomous vehicle and a computing device in communication with the perception system. The computing device includes one or more processors for controlling operations of the computing device and a memory for storing data and program instructions used by the one or more processors. The one or more processors are configured to execute instructions stored in the memory to: detect, using the perception system, a traffic officer wielding a traffic signal device; determine whether the traffic officer is directing a traffic signal to the autonomous vehicle with the traffic signal device; if the traffic officer is directing the traffic signal to the autonomous vehicle, determine whether content of the traffic signal is recognized; and if the content of the traffic signal is not recognized, send a command to one or more vehicle systems of the autonomous vehicle to implement one or more maneuvers consistent with the content of the traffic signal including a stop signal.

In another implementation, a computer-implemented method of automated driving is disclosed. The method includes detecting, using a perception system disposed on an autonomous vehicle, a traffic officer wielding a traffic signal device; determining whether the traffic officer is directing a traffic signal to the autonomous vehicle with the traffic signal device; if the traffic officer is directing the traffic signal to the autonomous vehicle, determining whether content of the traffic signal is recognized; and if the content of the traffic signal is not recognized, sending a command to one or more vehicle systems of the autonomous vehicle to implement one or more maneuvers consistent with the content of the traffic signal including a stop signal.

In another implementation, a computing device is disclosed. The computing device includes one or more processors for controlling operations of the computing device and a memory for storing data and program instructions used by the one or more processors. The one or more processors are configured to execute instructions stored in the memory to: detect, using a perception system disposed on an autonomous vehicle, a traffic officer wielding a traffic signal device; determine whether the traffic officer is directing a traffic signal to the autonomous vehicle with the traffic signal device; and if the traffic officer is directing the traffic signal to the autonomous vehicle, send a command to one or more vehicle systems of the autonomous vehicle to implement one or more maneuvers consistent with content of the traffic signal.

BRIEF DESCRIPTION OF THE DRAWINGS

The description herein makes reference to the accompanying drawings wherein like reference numerals refer to like parts throughout the several views, and wherein.

DETAILED DESCRIPTION

An automated driving system for an autonomous vehicle is disclosed. The automated driving system includes a perception system with various sensors configured to capture images or other visual representations of the environment surrounding the autonomous vehicle. The automated driving system is configured to detect a traffic officer, such as a construction worker, police officer, or crossing guard, wielding a traffic signal device, such as a hand, a wand, a sign, or a flag within the environment. Once detected, the automated driving system can determine whether the traffic officer is directing a traffic signal to the autonomous vehicle and whether the content of that traffic signal is recognized. If the content of the traffic signal is not recognized, the automated driving system can send a command to one or more vehicles systems, such as a braking system, to treat the traffic signal as a stop signal, and optionally, can request the driver to take over manual control of the autonomous vehicle after a predetermined time period.

Figure 1:
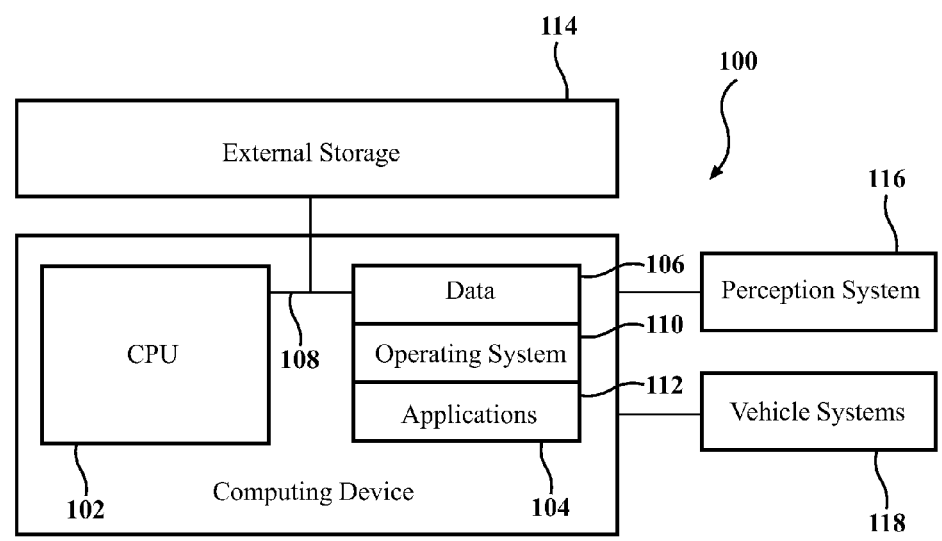
FIG. 1 is a block diagram of a computing device.

FIG. 1 is a block diagram of a computing device 100, for example, for use with an automated driving system. The computing device 100 can be any type of vehicle-installed, handheld, desktop, or other form of single computing device, or can be composed of multiple computing devices. The processing unit in the computing device can be a conventional central processing unit (CPU) 102 or any other type of device, or multiple devices, capable of manipulating or processing information. A memory 104 in the computing device can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs that permit the CPU 102 to perform the automated driving methods described below. The computing device 100 can also include secondary, additional, or external storage 114, for example, a memory card, flash drive, or any other form of computer readable medium. The installed applications 112 can be stored in whole or in part in the external storage 114 and loaded into the memory 104 as needed for processing.

The computing device 100 can also be in communication with a perception system 116. The perception system 116 can be configured to capture data and/or signals for processing by an inertial measurement unit (IMU), a dead-reckoning system, a global navigation satellite system (GNSS), a light detection and ranging (LIDAR) system, a radar system, a sonar system, an image-based sensor system, or any other type of system capable of capturing information specific to the environment surrounding a vehicle. Information specific to the environment surrounding a vehicle can include information specific to objects such as other vehicles proximate to a planned vehicle path, pedestrians, traffic officers such as construction workers, police officers, or crossing guards, obstacles, features of the planned vehicle path being traveled by the vehicle, or any other localized position data and/or signals that can be captured and sent to the CPU 102.

In the examples described below, the perception system 116 can be configured to capture, at least, images for an image-based sensor system such that the computing device 100 can detect the presence of traffic officers and determine the content of any traffic signals provided by the traffic officers within the images. The traffic officers can send traffic signals by wielding traffic signal devices such as the traffic officer's hand or arm, a sign, a wand, or a flag. The computing device 100 can also be in communication with one or more vehicle systems 118, such as a vehicle braking system, a vehicle propulsion system, a vehicle steering system, etc. The vehicle systems 118 can also be in communication with the perception system 116, the perception system 116 being configured to capture data indicative of performance of the various vehicle systems 118.

Figure 2:
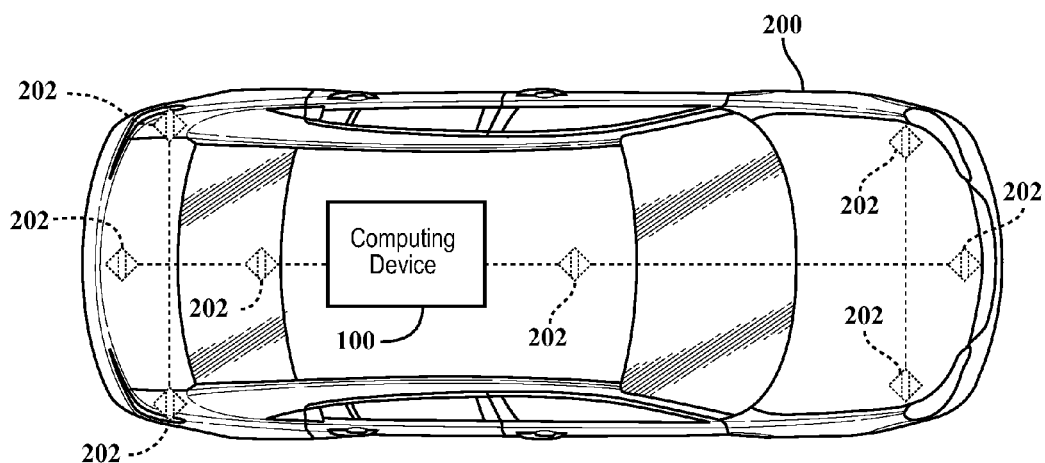
FIG. 2 is a schematic illustration of an autonomous vehicle including the computing device of FIG. 1.

FIG. 2 is a schematic illustration of an autonomous vehicle 200 including the computing device 100 of FIG. 1. The computing device 100 can be located within the autonomous vehicle 200 as shown in FIG. 2 or can be located remotely from the autonomous vehicle 200 in an alternate location (not shown). If the computing device 100 is located remotely from the autonomous vehicle 200, the autonomous vehicle 200 can include the capability of communicating with the computing device 100.

The autonomous vehicle 200 can also include a plurality of sensors 202, the sensors 202 being part of the perception system 116 described in reference to FIG. 1. One or more of the sensors 202 shown can be configured to capture images for processing by an image sensor, vehicle position in global coordinates based on signals from a plurality of satellites, the distance to objects within the surrounding environment for use by the computing device 100 to estimate position and orientation of the autonomous vehicle 200 and the objects within the surrounding environment, or any other data and/or signals that could be used to determine the current state of the autonomous vehicle 200 or determine the current state of the surrounding environment including the presence of, position of, and traffic signals provided by a traffic officer.

Figure 3A:
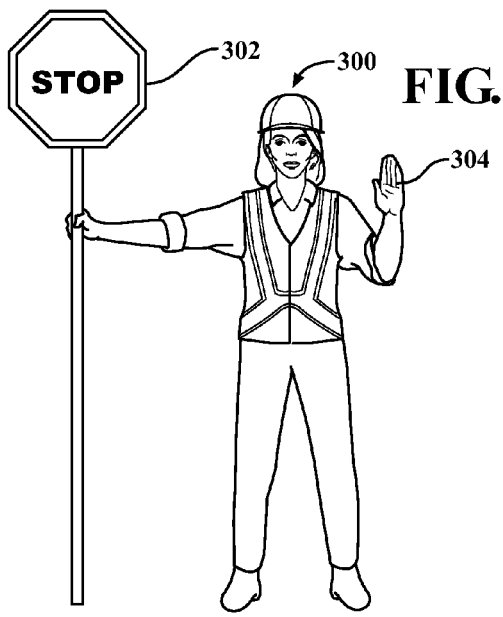
FIGS. 3A-F show example traffic signals provided by a construction worker to the autonomous vehicle of FIG. 2.
Figure 3B:
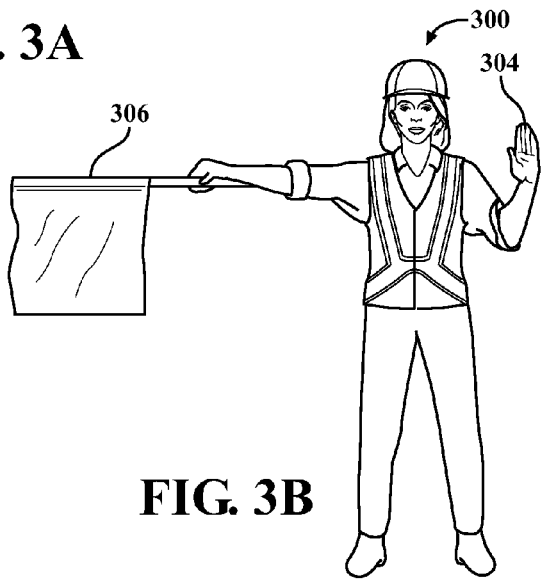

FIGS. 3A-F show example traffic signals provided by a construction worker 300 to the autonomous vehicle 200 of FIG. 2. The construction worker 300, one example of a traffic officer, can wield different types of traffic signal devices to send a variety of traffic signals. In FIG. 3A, the construction worker 300 is wielding both a stop sign 302 and her left hand 304 to send a stop signal to the autonomous vehicle 200. The stop signal is represented by the stop sign 302 facing the autonomous vehicle 200 and the palm of the construction worker's left hand 304 held upright and facing the autonomous vehicle 200. Similarly, in FIG. 3B, the construction worker 300 is wielding both a flag 306 in a position extended away from her body and her left hand 304 in the upright position with her palm facing the autonomous vehicle 200 to send a stop signal. Any of the three traffic signals shown in FIGS. 3A-B can alone or in combination represent a stop signal when directed toward the autonomous vehicle 200.

Figure 3C:
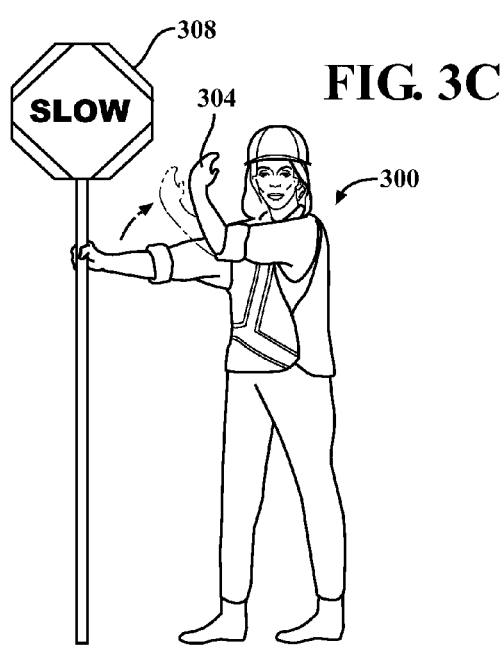
Figure 3D:
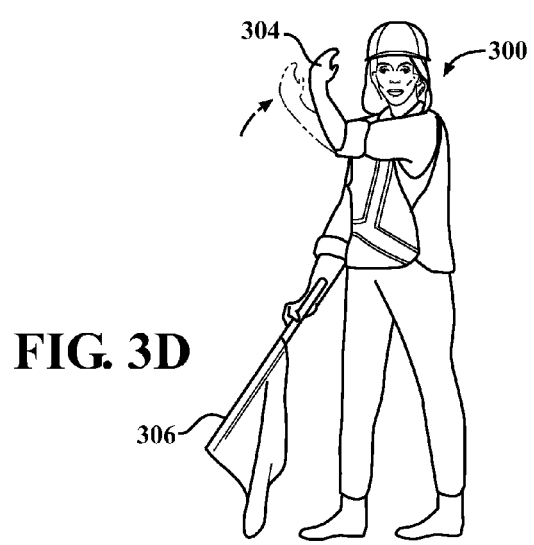

Another traffic signal device, a slow sign 308, is wielded by the construction worker 300 in FIG. 3C while the construction worker's left hand 304 is moving in an upward sweeping motion toward her face as indicated by the arrow. Both the slow sign 308 and the upward sweeping motion of the construction worker's left hand 304 send a proceed signal to the oncoming autonomous vehicle 200, that is, these traffic signals indicate that the autonomous vehicle 200 can proceed forward slowly or with caution. Similarly, in FIG. 3D, the construction worker 300 holds the flag 306 in a down-facing position near her body at the same time that she swings her left hand 304 in an upward motion toward her face to send a proceed signal. Any of the three traffic signals shown in FIGS. 3C-D can alone or in combination represent a proceed signal when directed toward the autonomous vehicle 200.

Figure 3E:
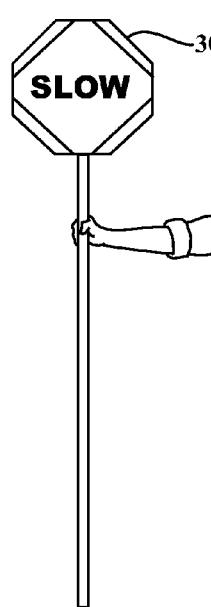
Figure 3F:
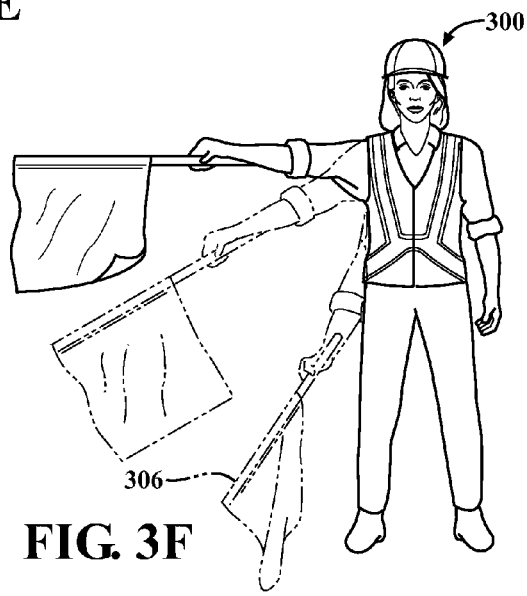

In FIG. 3E, the construction worker 300 wields the slow sign 308 and moves her left hand 304 in an up and down motion in front of her body as denoted by the arrows to send a warning signal, that is, an alert to the autonomous vehicle 200 to be wary of the conditions ahead, such as would be necessary in a construction zone. Similarly, in FIG. 3F, the construction worker 300 moves the flag 306 up and down in a 90° arc with her arm extended from her body to send the warning signal to the autonomous vehicle 200. Any of the three traffic signals shown in FIGS. 3E-F can alone or in combination represent a warning signal when directed toward the autonomous vehicle 200.

In order to respond to traffic signals, the autonomous vehicle 200 must first identify any traffic officers such as the construction worker 300. The automated driving system can use image-based detection, LIDAR detection, and/or camera fusion to identify both the traffic officers and their traffic signal devices. In order to differentiate traffic officers from other pedestrians, the automated driving system can also be configured to identify environmental features often associated with the presence of traffic officers such as downed or inoperable traffic lights, construction equipment, construction markers such as cones or barrels, school zones and school crossings, etc.

If the autonomous vehicle 200 detects a traffic officer wielding a traffic signal device, such as the construction worker 300 wielding the stop sign 302, her left hand 304, or the flag 306 as described in FIGS. 3A-F, the automated driving system can determine whether the construction worker 300 is directing any traffic signals, such as a stop signal, proceed signal, or warning signal, to the autonomous vehicle 200. This determination can include using a pose recognition algorithm and/or determining the orientation of the construction worker 300 to the autonomous vehicle, that is, whether the construction worker 300 is facing toward or away from the autonomous vehicle 200 while providing the traffic signals. If the construction worker 300 is not directing any traffic signals to the autonomous vehicle 200, the autonomous vehicle 200 can continue along its planned vehicle path.

If the construction worker 300 is directing a traffic signal to the autonomous vehicle 200 with the traffic signal device, the automated driving system can determine whether the content of the traffic signal is recognized. For example, in FIG. 3C, the content of the traffic signal is a proceed signal, that is, the slow sign 308 and the upward waving left hand 304 of the construction worker 300 are recognized in a series of images or laser returns captured by the perception system 116 as conveying that the autonomous vehicle 200 can proceed with caution. When the content of the traffic signal is recognized, the automated driving system can send a command to one or more vehicle systems 118 to implement one or more maneuvers, such as steering or braking, consistent with the content of the traffic signal.

If the content of the traffic signal is not recognized, for example, when the traffic signals provided by the construction worker 300 to the autonomous vehicle 200 do not match a library of known traffic signals such as those shown in FIGS. 3A-F for a construction zone, the automated driving system can be configured to send a notification to a driver of the autonomous vehicle 200 to take control of one of more vehicle systems 118 if a predetermined time period, such as 5 or 10 seconds, has passed. In another example, if the content of the traffic signal is not recognized, the automated driving system can be configured to send a command to one or more vehicle systems 118 to implement one or more maneuvers consistent with the content of the traffic signal including a stop signal, that is, the autonomous vehicle 200 can treat the unidentified traffic signal provided by the traffic officer as a stop sign. These responses can also be combined: if the autonomous vehicle 200 reacts by stopping because a traffic signal from a traffic officer is not recognized, a notification can be sent to the driver to take control of the autonomous vehicle 200 after a predetermined amount of time has passed. Additional types of traffic officers, traffic signal devices, and traffic signals are described below in reference to FIGS. 4A-F and 5A-C.

Figure 4A:
FIGS. 4A-F show example traffic signals provided by a police officer to the autonomous vehicle of FIG. 2.
Figure 4B:
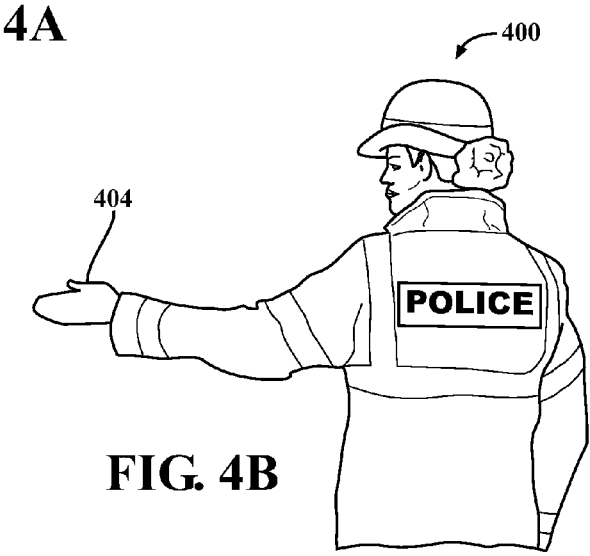
Figure 4C:
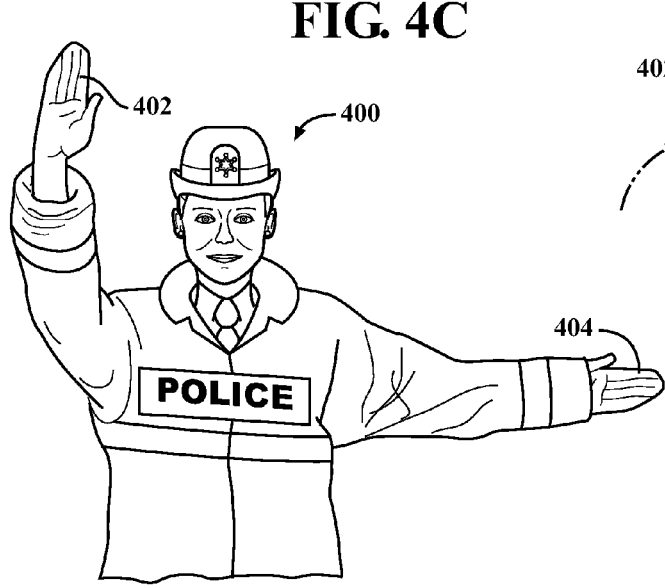

FIGS. 4A-F show example traffic signals provided by a police officer 400 to the autonomous vehicle 200 of FIG. 2. In FIG. 4A, the police officer 400 is wielding her right hand 402 to send a stop signal to the autonomous vehicle 200. The stop signal is represented by the palm of the police officer's right hand 402 in a raised position facing away from her body and is directed to traffic facing the police officer 400. In FIG. 4B, the police officer 400 is wielding her left hand 404 to send a stop signal to the autonomous vehicle 200. The stop signal is represented by the back of the police officer's left hand 404 extended away from her body at chest level and is directed to traffic behind the police officer 400. The combination of stop signals from FIGS. 4A-B is shown in FIG. 4C where the police officer 400 is wielding both her right hand 402 and her left hand 404 to send stop signals to traffic both behind her and in front of her. Thus, the autonomous vehicle 200 is configured to recognize the orientation or pose of the traffic officer, as the interpretation of the content of a traffic signal depends on the direction in which the autonomous vehicle 200 is approaching the traffic officer.

Figure 4D:
Figure 4E:
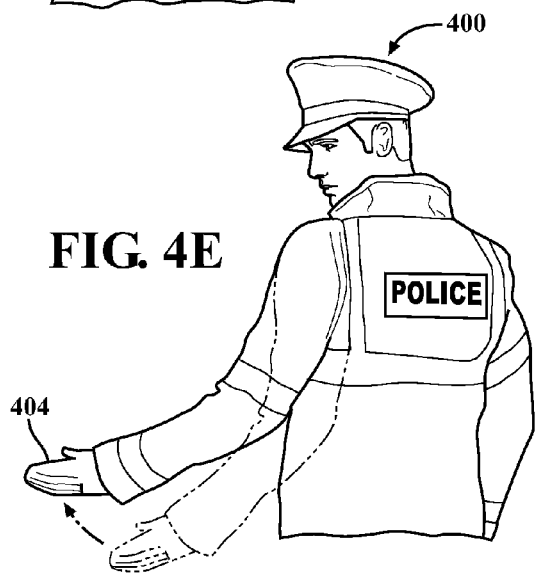
Figure 4F:

The importance of orientation recognition is also shown in FIGS. 4D-F. In FIG. 4D, the police officer 400 is wielding his right hand 402 to send a proceed signal to the autonomous vehicle 200. The proceed signal is represented by the police officer's right hand 402 in a raised position waving toward his body as represented by the arrow and is directed to traffic facing the police officer 400. In FIG. 4E, the police officer 400 is wielding his left hand 404 to send a proceed signal to the autonomous vehicle 200. The proceed signal is represented by the police officer's left hand 404 extended away from his body and waving up and down at hip level as indicated by the arrow and is directed to traffic behind the police officer 400. In FIG. 4F, the police officer 400 is wielding his right hand 402 to send a proceed signal to the autonomous vehicle 200. The proceed signal is represented by the police officer's right hand 402 in a raised position waving toward his body as represented by the arrow and is directed to traffic approaching the ride side of the police officer 400.

The automated driving system can recognize the direction in which the police officer 400 is sending a traffic signal within, for example, captured images, based on the orientation of both her/his torso and head. In FIGS. 4A, 4C, and 4D, the police officer's face and torso are facing forward, thus the traffic signals are directed to oncoming traffic. In FIGS. 4B and 4E, the police officer's face is turned to the side while her/his torso is facing backward, thus the traffic signals are directed to traffic behind the police officer 400. In FIG. 4F, the police officer's torso is turned to the side while his face is facing forward, thus the traffic signals are directed to traffic on the right side of the police officer 400.

Figure 5A:
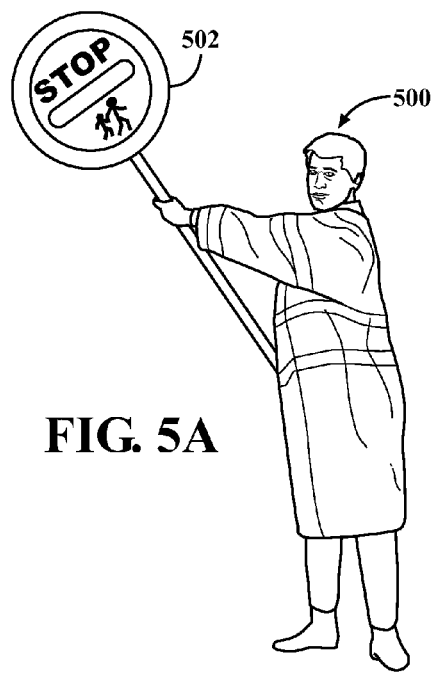
FIGS. 5A-C show example traffic signals provided by a crossing guard to the autonomous vehicle of FIG. 2.
Figure 5B:
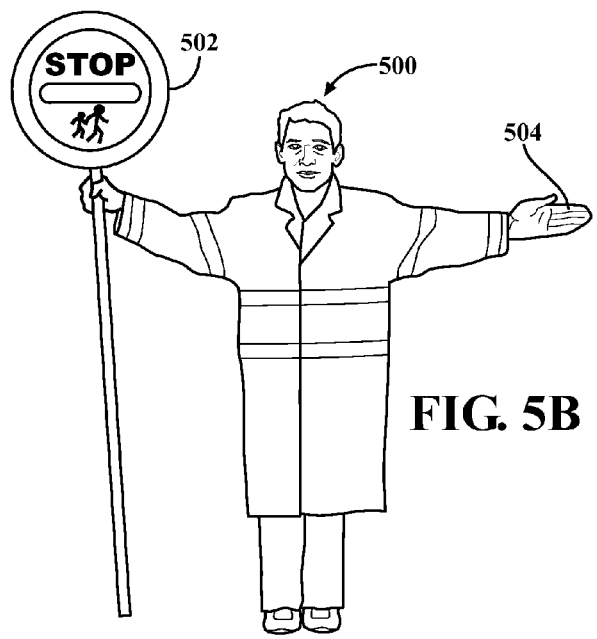
Figure 5C:
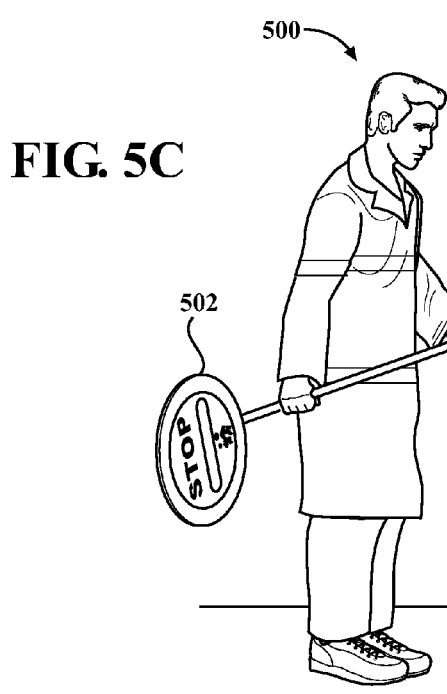

FIGS. 5A-C show example traffic signals provided by a crossing guard 500 to the autonomous vehicle 200 of FIG. 2. In FIG. 5A, the crossing guard 500 is wielding a stop sign 502 to send a warning signal to the autonomous vehicle 200. The warning signal is represented by the stop sign 502 being held in a raised and angled position away from the crossing guard's body and is directed to traffic facing the crossing guard 500. In FIG. 5B, the crossing guard 500 is wielding both the stop sign 502 and his left hand 504 to send a stop signal to the autonomous vehicle 200. The stop signal is represented by a combination of the crossing guard's left hand 504 extended out from his body at chest level and the stop sign 502 held in an upright position extended out from his body at chest level and is directed to traffic facing the crossing guard 500. In FIG. 5C, the crossing guard 500 is wielding the stop sign 502 to send a proceed signal to the autonomous vehicle 200 while at the same time sending a stop signal to pedestrians, such as the children shown to the right of the crossing guard 500. The proceed signal is represented by the stop sign 502 being held in a sideways position against the crossing guard's body while the crossing guard 500 faces the pedestrians, e.g. the side of the crossing guard's body is facing the autonomous vehicle 200. Again, the autonomous vehicle 200 is configured to recognize the orientation or pose of the traffic officer, as the interpretation of the content of a traffic signal depends on the direction in which the autonomous vehicle 200 is approaching the traffic officer.

Figure 6:
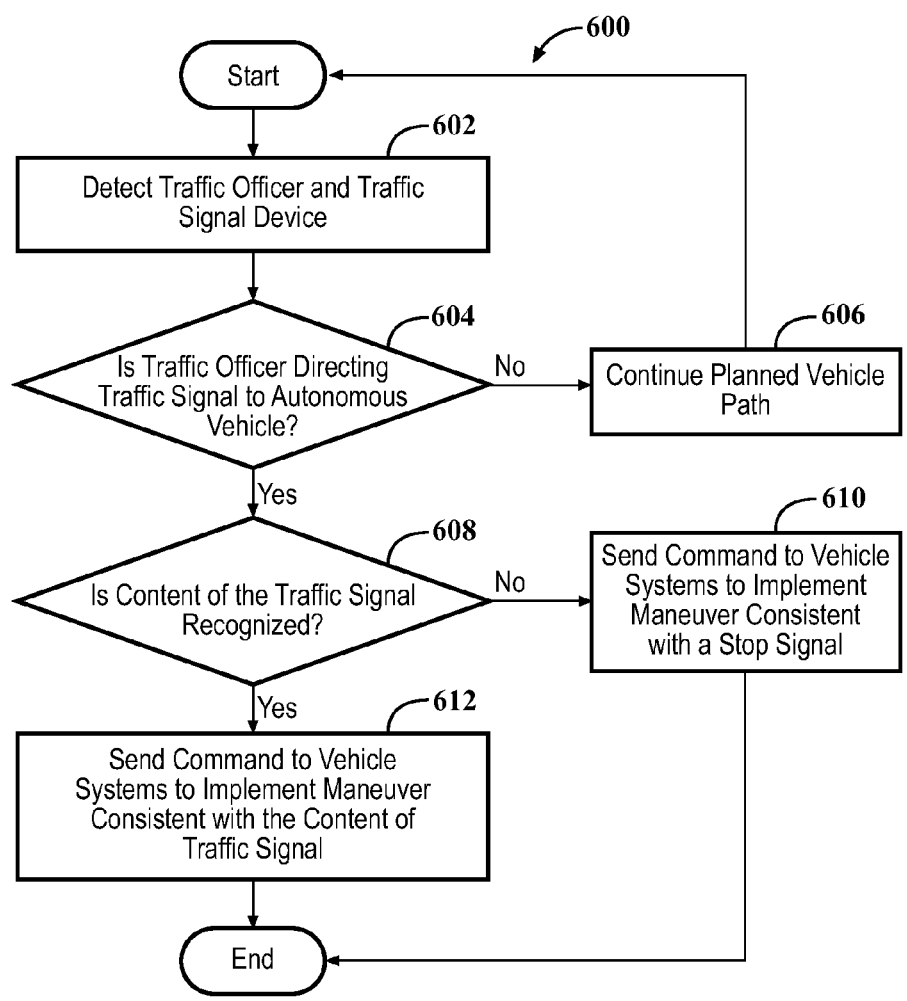
FIG. 6 is a logic flowchart of a traffic officer detection and response process performed by the automated driving system.

FIG. 6 is a logic flowchart of a traffic officer detection and response process 600 performed by the automated driving system of the autonomous vehicle 200. In step 602, the automated driving system detects a traffic officer wielding a traffic signal device. For example, the perception system 116 can capture the construction worker 300 wielding the stop sign 302, her left hand 304, and/or the flag 306 as in FIGS. 3A-F, the police officer 400 wielding her/his right hand 402 and/or left hand 404 as in FIGS. 4A-F, the crossing guard 500 wielding the stop sign 502 or his left hand 504 as in FIGS. 5A-C, or any other traffic officer wielding any other traffic signal device, for example, an illuminated wand or a text-based sign, configured to provide traffic signals that can be captured and compared to a library of standardized traffic signals for interpretation by the automated driving system.

In decision block 604, the automated driving system determines whether the traffic officer is directing a traffic signal to the autonomous vehicle 200 with the traffic signal device. For example, as described in FIGS. 3A-F, the construction worker 300 is directing stop signals, proceed signals, and warning signals to oncoming vehicles based on her orientation, that is, based on her face and torso being captured in a forward orientation. As described in FIGS. 4A, 4C, and 4D, the police officer 400 is directing stop signals and proceed signals to oncoming vehicles based on her/his face and torso being captured in a forward orientation. Alternatively, in FIGS. 4B and 4E the police officer 400 is directing stop signals and proceed signals to traffic behind her/him based on her/his face being captured in a sideways orientation and her/his torso being captured in a backward orientation. Similarly, in FIGS. 4F and 5C, the police officer 400 and the crossing guard 500 are directing proceed signals to traffic approaching their right sides based on their torsos being captured in a sideways orientation. If the traffic officer is not directing any traffic signals to the autonomous vehicle 200, the process 600 continues to step 606, and the autonomous vehicle 200 continues its planned vehicle path.

If the traffic officer is directing a traffic signal to the autonomous vehicle 200 with the traffic signal device, the process 600 continues to decision block 608, where the automated driving system determines whether the content of the traffic signal is recognized. As described previously, the content of the traffic signal can be a proceed signal, a warning signal, a stop signal, or any other traffic-based command meant to be conveyed from the traffic officer to the autonomous vehicle 200 and implemented by the autonomous vehicle 200. If the content of the traffic signal is not recognized, the process 600 continues to step 610, and the automated driving system sends a command to one or more vehicle systems 118 to implement one or more maneuvers consistent with the content of the traffic signal including a stop signal.

For example, if the crossing guard 500 of FIGS. 5A-5C is captured in a series of images moving the stop sign 502 through a golf-swing motion, which is not a recognized traffic signal, the automated driving system can send a command to the braking system to stop the autonomous vehicle 200 and treat the crossing guard 500 and his unrecognized traffic signal as a stop sign or four-way stop if applicable (e.g. at an intersection). Optionally, if the autonomous vehicle 200 has stopped based on the unrecognized traffic signal, the automated driving system can send a notification to the driver to take control of one or more vehicle systems 118 after a predetermined time period, for example, 5 or 10 seconds. The predetermined time period can be used by the automated driving system to capture and attempt to recognize additional traffic signals from the traffic officer before making the request for driver intervention.

If the content of the traffic signal is recognized at decision block 608, the process 600 continues to step 612, and the automated driving system can send a command to one or more vehicle systems 118 to implement one or more maneuvers, such as steering or braking, consistent with the content of the traffic signal. For example, if the automated driving system recognizes the warning signals of FIG. 3E, 3F, or 5A, the autonomous vehicle 200 can be controlled to slow its speed by braking in preparation for the potential reception of a stop signal, such as the stop signals in FIGS. 3A, 3B, and 5B. In another example, if the automated driving system recognizes the proceed signals of FIG. 3C, 3D, 4D, 4E, or 4F, depending on its location and/or orientation in respect to the traffic officer, the autonomous vehicle 200 can be controlled to continue its planned vehicle path past the traffic officer. After step 612, the process 600 ends.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. The scope of the claims is to be accorded the broadest interpretation so as to encompass all such modifications and equivalent structures as is permitted under the law.

What is claimed is:

1. An automated driving system, comprising:
a perception system disposed on an autonomous vehicle; and
a computing device in communication with the perception system, the computing device including:
one or more processors for controlling operations of the computing device; and a memory for storing data and program instructions used by the one or more processors, wherein the one or more processors are configured to execute instructions stored in the memory to:
capture, using the perception system, image data of at least a portion of a surrounding environment of the autonomous vehicle;
detect a presence of a traffic officer wielding a traffic signal device within the captured image data;
determine whether the traffic officer is directing a traffic signal to the autonomous vehicle with the traffic signal device;
if the traffic officer is directing the traffic signal to the autonomous vehicle, compare the traffic signal to a library of known traffic signals to determine whether content of the traffic signal is recognized, wherein the content of the traffic signal is not recognized if the traffic signal does not match a traffic signal included in the library of known traffic signals; and
if the content of the traffic signal is not recognized, send a command to one or more vehicle systems of the autonomous vehicle to implement one or more maneuvers consistent with a stop signal.

2. The automated driving system of claim 1, wherein the traffic officer is at least one of a construction worker, a police officer, and a crossing guard.

3. The automated driving system of claim 1, wherein determining whether the traffic officer is directing the traffic signal to the autonomous vehicle includes determining an orientation of the traffic officer in respect to the autonomous vehicle.

4. The automated driving system of claim 1, wherein the traffic signal device is at least one of a hand, a sign, a wand, and a flag.

5. The automated driving system of claim 1, wherein the content of the traffic signal includes at least one of a proceed signal, a warning signal, and a stop signal.

6. The automated driving system of claim 1, wherein the processor is further configured to:
if the traffic officer is not directing the traffic signal to the autonomous vehicle, continue a planned vehicle path.

7. The automated driving system of claim 1, wherein the processor is further configured to:
    if the content of the traffic signal is recognized, send a command to the one or more vehicle systems of the autonomous vehicle to implement one or more maneuvers consistent with the content of the traffic signal.

8. The automated driving system of claim 1, wherein the processor is further configured to:
    if the content of the traffic signal is not recognized after a predetermined time period, send a notification to a driver of the autonomous vehicle to take control of the one of more vehicle systems.

9. A computer-implemented method of automated driving, comprising:
    capture, using the perception system disposed on an autonomous vehicle, image data of at least a portion of a surrounding environment of the autonomous vehicle;
    detecting a presence of a traffic officer wielding a traffic signal device within the captured image data;
    determining whether the traffic officer is directing a traffic signal to the autonomous vehicle with the traffic signal device;
    if the traffic officer is directing the traffic signal to the autonomous vehicle, comparing the traffic signal to a library of known traffic signals to determine whether content of the traffic signal is recognized, wherein the content of the traffic signal is not recognized if the traffic signal does not match a traffic signal included in the library of known traffic signals; and
    if the content of the traffic signal is not recognized, sending a command to one or more vehicle systems of the autonomous vehicle to implement one or more maneuvers consistent with a stop signal.

10. The method of claim 9, wherein determining whether the traffic officer is directing the traffic signal to the autonomous vehicle includes determining an orientation of the traffic officer in respect to the autonomous vehicle.

11. The method of claim 9, wherein the traffic signal device is at least one of a hand, a sign, a wand, and a flag.

12. The method of claim 9, further comprising:
    if the traffic officer is not directing the traffic signal to the autonomous vehicle, continuing a planned vehicle path.

13. The method of claim 9, further comprising:
    if the content of the traffic signal is recognized, sending a command to the one or more vehicle systems of the autonomous vehicle to implement one or more maneuvers consistent with the content of the traffic signal.

14. The method of claim 9, further comprising:
    if the content of the traffic signal is not recognized after a predetermined time period, sending a notification to a driver of the autonomous vehicle to take control of the one of more vehicle systems.

15. A computing device, comprising:
    one or more processors for controlling operations of the computing device; and
    a memory for storing data and program instructions used by the one or more processors, wherein the one or more processors are configured to execute instructions stored in the memory to:
        capture, using a perception system disposed on an autonomous vehicle, image data of at least a portion of a surrounding environment of the autonomous vehicle;
        detect a presence of a traffic officer wielding a traffic signal device based on the captured image data;
        determine whether the traffic officer is directing a traffic signal to the autonomous vehicle with the traffic signal device;
        if the traffic officer is directing the traffic signal to the autonomous vehicle, compare the traffic signal to a library of known traffic signals to determine whether content of the traffic signal is recognized;
        if the content of the traffic signal is recognized, send a command to one or more vehicle systems of the autonomous vehicle to implement one or more maneuvers consistent with content of the traffic signal; and
        if the content of the traffic signal is not recognized, send a command to one or more vehicle systems of the autonomous vehicle to implement one or more maneuvers consistent with a stop signal.

16. The computing device of claim 15, wherein the traffic officer is at least one of a construction worker, a police officer, and a crossing guard.

17. The computing device of claim 15, wherein the traffic signal device is at least one of a hand, a sign, a wand, and a flag.

18. The computing device of claim 15, wherein determining whether the traffic officer is directing the traffic signal to the autonomous vehicle includes determining an orientation of the traffic officer in respect to the autonomous vehicle.

19. The computing device of claim 15, wherein the processor is further configured to:
    if the traffic officer is not directing the traffic signal to the autonomous vehicle, send a command to one or more vehicle systems of the autonomous vehicle to continue a planned vehicle path.

20. The computing device of claim 15, wherein the content of the traffic signal includes at least one of a proceed signal, a warning signal, a slow signal, and a stop signal.

* * * * *